United States Patent
Hardy et al.

(10) Patent No.: US 10,927,246 B2
(45) Date of Patent: Feb. 23, 2021

(54) BENZOIC SULFIMIDE BINDERS AND INSULATION ARTICLES COMPRISING THE SAME

(71) Applicant: KNAUF INSULATION, INC., Shelbyville, IN (US)

(72) Inventors: Christopher George Hardy, Greensburg, IN (US); John P. Wade, Shelbyville, IN (US)

( * ) Notice: Subject to any disclaimer, the term of this patent is extended or adjusted under 35 U.S.C. 154(b) by 0 days.

(21) Appl. No.: 16/565,277

(22) Filed: Sep. 9, 2019

(65) Prior Publication Data

US 2020/0087503 A1    Mar. 19, 2020

Related U.S. Application Data

(63) Continuation of application No. 62/731,480, filed on Sep. 14, 2018.

(51) Int. Cl.
*C08L 29/04* (2006.01)
*C08K 5/435* (2006.01)

(52) U.S. Cl.
CPC .............. *C08L 29/04* (2013.01); *C08K 5/435* (2013.01)

(58) Field of Classification Search
CPC ................................ C08L 29/04; C08K 5/435
USPC .......................................................... 524/503
See application file for complete search history.

(56) References Cited

U.S. PATENT DOCUMENTS 7,842,382 B2 *  11/2010  Helbing ............... C09D 129/04
                                                          428/375

* cited by examiner

*Primary Examiner* — Hui H Chin
(74) *Attorney, Agent, or Firm* — Knauf Insulation, Inc.; James K. Blodgett; Brandon N. Hudder

(57) ABSTRACT

The present disclosure generally relates to an aqueous curable binder composition comprising (i) a benzoic sulfimide, (ii) a carbohydrate or alcohol, and (iii) the reaction product of (i) and (ii), at a defined ratio of carbohydrate or alcohol compound to benzoic sulfimide compound. In some embodiments, the aqueous curable binder is produced using renewable materials and is characterized by improved cure rates. In additional embodiments, the composition is disposed onto an assembly of fibers or particles for the production of an insulation product.

17 Claims, 2 Drawing Sheets

FIGURE 1

| Binder | Binder LD | | | Binder B | | | R:S 2:1 | | | R:S 3:1 | | | R:S 4:1 | | | R:S 5:1 | | |
|---|---|---|---|---|---|---|---|---|---|---|---|---|---|---|---|---|---|---|
| Cure Temp. (F) | 400 | 450 | 500 | 400 | 450 | 500 | 400 | 450 | 500 | 400 | 450 | 500 | 400 | 450 | 500 | 400 | 450 | 500 |
| Dry Tensile Average | 14.8 | 15.9 | 14.3 | 13.5 | 13.8 | 13.9 | 11.1 | 13.1 | 13.2 | 14.2 | 14.2 | 15.7 | 13.3 | 13.3 | 14.8 | 14.1 | 15.2 | 13.9 |
| Dry Tensile Conf. Int. | 1.1 | 0.9 | 0.9 | 1.1 | 0.5 | 0.7 | 0.7 | 0.7 | 1.4 | 0.7 | 0.9 | 1 | 0.7 | 0.9 | 1 | 1 | 0.8 | 0.7 |
| Dry Tensile Average | 8.4 | 10.9 | 11.7 | 6.8 | 8.5 | 8.7 | 5.4 | 12.9 | 12.9 | 6.1 | 11.9 | 12.5 | 4.9 | 11.3 | 13.7 | 2.9 | 9.3 | 10.8 |
| Dry Tensile Conf. Int. | 1.9 | 0.9 | 0.9 | 0.6 | 0.4 | 0.7 | 0.6 | 0.7 | 0.7 | 0.9 | 0.7 | 1.2 | 1 | 0.7 | 0.6 | 0.6 | 0.5 | 0.7 |
| Avg Extract ABS | 0.092 | 0.062 | 0.017 | 0.088 | 0.034 | 0.018 | 0.055 | 0.011 | 0.005 | 0.118 | 0.027 | 0.012 | 0.207 | 0.035 | 0.012 | 0.443 | 0.075 | 0.035 |
| Avg pH | 3.76 | 4.32 | 4.15 | 4.30 | 5.48 | 5.79 | 5.38 | 6.68 | 7.15 | 6.04 | 6.75 | 7.18 | 6.16 | 6.79 | 7.21 | 6.15 | 6.63 | 7.18 |
| Avg LOI (%) | 14.55 | 14.25 | 14.35 | 13.09 | 12.18 | 10.89 | 12.52 | 13.21 | 11.82 | 15.91 | 13.36 | 12.88 | 17.07 | 13.68 | 11.79 | 18.20 | 15.35 | 12.89 |
| Normalized Dry (%) | 15.0 | 17.6 | 14.2 | 13.9 | 15.8 | 15.5 | 9.9 | 17.4 | 14.9 | 12.7 | 14.4 | 19.4 | 10.4 | 13.1 | 18.6 | 10.7 | 15.1 | 15.1 |
| Normalized Wet (%) | 4.3 | 9.4 | 9.5 | 3.5 | 6.9 | 9.9 | 2.3 | 12.7 | 14.8 | 2.3 | 10.1 | 12.3 | 1.4 | 9.4 | 16.0 | 0.5 | 5.6 | 9.0 |

# BENZOIC SULFIMIDE BINDERS AND INSULATION ARTICLES COMPRISING THE SAME

CROSS-REFERENCE TO RELATED APPLICATIONS

This application claims priority to U.S. Application Ser. No. 62/731,480, filed Sep. 14, 2018, the entire disclosure of which is expressly incorporated by reference herein.

BACKGROUND OF THE INVENTION

The present disclosure relates to an aqueous carbohydrate based binder composition, comprising a benzoic sulfimide component and a carbohydrate component, wherein the carbohydrate component comprises one or more reducing sugars, as well as to a method of its production.

The use of binders is important in the manufacture of articles which are based on non- or loosely-assembled matter. For example, binders are extensively used in the production of both cured and uncured products comprising consolidated fibers, including thermosettable binder compositions that are optionally cured upon heat treatment. Examples of such thermosetting binder compositions include a variety of phenol-aldehyde, urea-aldehyde, melamine-aldehyde, and other condensation-polymerization materials like furane and polyurethane resins. Binder compositions based on phenol-aldehyde, resorcinol-aldehyde, phenol/aldehyde/urea, phenol/melamine/urea, and related systems are frequently used for binding fibers, textiles, plastics, rubbers, and other commercial materials.

The mineral wool and fiberboard manufacturing industries have historically utilized phenol formaldehyde based binder systems in their products. Phenol formaldehyde binders provide commercially acceptable binding and adhesion properties, and are readily available and easily processed. However, increasing regulatory restrictions and environmental concerns necessitate the development of alternative binder systems. These alternative binder systems include carbohydrate-based binders, which may be obtained by reacting a carbohydrate with a multiprotic acid as described, e.g. in WIPO Pat. Appl. Pub. No. WO 2009/019235, or via the esterification of a polycarboxylic acid with a polyol as provided for, e.g. in U.S. Pat. Appl. Pub. No. 2005/0202224. Such alternative binders lacking formaldehyde as a reagent may be collectively referred to as "formaldehyde-free binders".

Additionally, formaldehyde-free binders resulting from the combination and reaction products of one or more amine components and at least one reducing sugar (or non-carbohydrate carbonyl) component have been reported, e.g. in WIPO Pat. Appl. Pub. No. WO 2007/014236. The binders described therein may be produced via Maillard reactions to form polymeric melanoidins, which provide sufficient bonding strength.

However, in addition to avoiding binder systems which contain less desirable reactants or reaction products, such as formaldehyde, an increase in the cure rate of the binder is constantly desired for beneficially reducing the production time of the binder and resulting products, while enhancing the commercial flexibility usefulness of the binder, e.g. at lower temperatures and/or enhanced temperature ranges.

A need therefore exists for less environmentally impactful, "green" binder compositions that can be produced using natural and renewable components, while further offering improved curing rates versus conventional binders.

Accordingly, a technical problem addressed by the present technology is the development and use of a binder composition produced from renewable and/or environmentally responsible materials that are characterized by improved cure rates, as well as methods for producing the same.

SUMMARY OF THE INVENTION

The present disclosure generally relates to an aqueous curable binder composition comprising (a) a benzoic sulfimide component, (b) a carbohydrate or alcohol component, (c) the reaction product of (a) and (b), wherein the ratio of carbohydrate or alcohol compound(s) to benzoic sulfimide compound(s) ranges from 0.25:1 to 10:1, including 0.5:1 to 10:1, and 1:1 to 10:1. In some embodiments, the composition comprises 1-10% by weight benzoic sulfimide, such as 2-5% by weight benzoic sulfimide. In further embodiments, the benzoic sulfimide is a saccharin salt. In additional embodiments, the saccharin salt of the aqueous curable binder is selected from Group I and Group II (alkali and alkaline earth metals, respectively) saccharin salts, ammonium saccharin, sodium saccharin, calcium saccharin, potassium saccharin, amine salts of saccharin and mixtures thereof.

In some embodiments, the carbohydrate of the aqueous curable binder is selected from the group consisting of high fructose corn syrup (HFCS), reducing sugars, non-reducing sugars, starches, cellulose including cellulosic hydrolysates, molasses and mixtures thereof. In certain embodiments, HFCS comprises glucose, dextrose (the dextrorotatory and most common naturally occurring form of glucose), other sugars/polysaccharides (including glucose chains) and water. In embodiments where dextrose is utilized, the dextrose may comprise a dextrose equivalent value of at least about 0.85, at least about 0.9 and at least about 0.95. In non-limiting examples, non-food grade dextrose products such as Sirodex 331 (Tate & Lyle, Hoffman Estates, Ill., USA), which is a 75% solids sugar solution with a DE value of 94.5, may be used. In alternative embodiments, the alcohol used in the production of the composition comprises polyvinyl alcohol (PVA). In further embodiments, the aqueous curable binder is anhydrous.

In still further embodiments, the ratio of carbohydrate or alcohol compound to benzoic sulfimide compound used in the production of the aqueous curable binder ranges from 4:1 to 5:1. In certain embodiments, the composition further comprises one or more matrix monomers and/or polymers selected from the group consisting of amines, organic acids, inorganic acids, organic amine salts, inorganic amine salts, naturally derived polymers, polysaccharides, cellulose and cellulosic lysates, starch, molasses, alginate, hyaluronic acid, carboxymethyl cellulose (CMC), sodium carboxymethyl cellulose (NaCMC), hydroxypropyl cellulose (HPC), 2-hydroxyethyl cellulose (HEC), oligosaccharides, synthetically derived polymers, polyvinyl polymers, PVA, PVAc, PAN, polyacrylics, polyacrylate, polymethacrylate, polyacrylamide, polymethacrylamides, polyurethanes, polyesters, aliphatic isocyanate oligomers, azetidinium containing polymer, chitosan, derivatives thereof and mixtures thereof.

In some embodiments, the aqueous curable binder further comprises an ammonium ion source at a ratio of benzoic sulfimide compound to ammonium compound and/or ammonium ion of 1:1 to 20:1. In additional embodiments, the composition further comprises one or more dyes, antifungal agents, antibacterial agents, hydrophobic compounds, silicone containing coupling agents, silane, dedusting oil and hydrophobic polymers. In embodiments where a silane components is incorporated as an additive, the binder and/or binder solution may comprise at least about 0.1% to about 1.0% by dry weight of the silane component(s). Moreover, the silane component may comprise one or more amino and/or ethyl chemical groups whose presence may significantly improve the long term strength of the binder and/or reduce weathering of the binder and/or articles comprising the binder. In further embodiments, the aqueous curable binder is curable at a temperature of 50-200° C. In still further embodiments, the composition is uncured.

In some embodiments, the present technology relates to an assembly of fibers or particles bonded with the aqueous curable binder composition disclosed herein. In further embodiments, the assembly of fibers comprises an insulation product selected from the group consisting of mineral wool mat, fiberglass insulation mat, rockwool mat, natural fiber mat, plywood, particle board, oriented strand board and medium density fiberboard. In still further embodiments, the insulation product is uncured.

BRIEF DESCRIPTION OF THE DRAWINGS

The following drawings are included to further demonstrate certain embodiments and aspects of the present disclosure.

FIG. 1 shows physicochemical measurements performed on various binder compositions and comparative examples in accordance with certain embodiments of the disclosed technology.

DETAILED DESCRIPTION OF THE INVENTION

Figure 2:
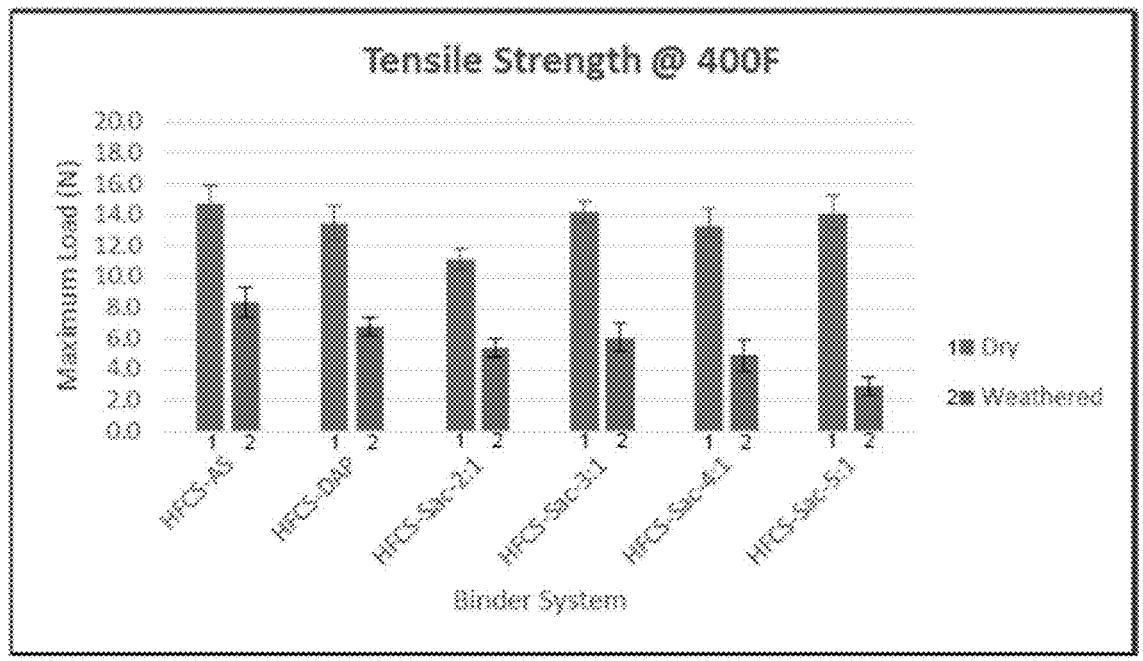
FIG. 2 shows thermal dependent tensile strength measurements performed on various binder compositions and comparative examples in accordance with certain embodiments of the disclosed technology.
Figure 2:
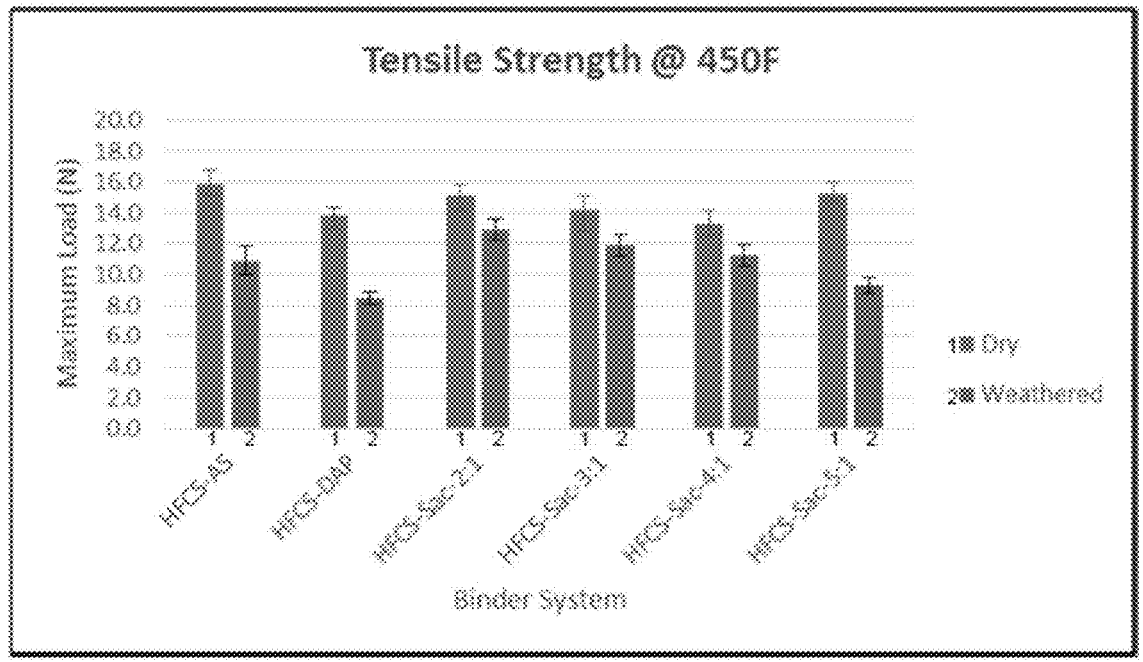

According to the present disclosure, the expression "aqueous curable binder composition" is not specifically restricted and may comprise or consist of any mixture of at least the aforementioned binder components (a) and (b) in an aqueous environment and/or a water-containing solvent. The mixture may comprise a partial solution of one or more of binder components (a), (b) and/or (c), or may be present as a dispersion, including but not limited to an emulsion or a suspension. As described herein, the term "aqueous" is not restricted to water only as a solvent, but also includes solvents comprising mixtures, wherein water is one of the chemical components. In some embodiments, the aqueous curable binder composition of the present disclosure comprises a solution or a suspension.

In further embodiments, the composition comprises at least one "benzoic sulfimide" salt, which may alternatively be referred to as a "cyclic sulfonamide" In non-limiting embodiments, benzoic sulfimides for use in the disclosed technology may comprise one or more of Group I and Group II saccharin salts, ammonium saccharin, sodium saccharin, calcium saccharin, potassium saccharin and mixtures thereof.

In certain embodiments, the solid content of the curable aqueous binder composition may range, for example, from 5-95% by mass, from 8-90% by mass, and from 10-85% by mass, based on the mass of the total curable aqueous binder composition. In additional embodiments, the solid content of the curable aqueous binder composition may be adjusted or manipulated to accommodate the commercial application(s) of interest.

In embodiments where the aqueous curable binder is utilized for mineral wool insulation applications, the solid content of the aqueous binder composition may be in the range of 5-25% by mass, including 10 to 20% by mass and 12-18% by mass, based on the mass of the total aqueous binder composition. In some embodiments, the aqueous curable binder is utilized for wood board applications and the solid content of the aqueous binder composition may be in the range of 50-90% by mass, including 55-85% by mass and 60-80% by mass, based on the mass of the total aqueous binder composition.

In applications where the disclosed binder solution is sprayed onto hot mineral wool fibers immediately after their production, the residual heat of the mineral wool fibers may cause a significant portion of water present in the binder solution to evaporate. The mineral wool fibers may subsequently be collected to form a batt and may comprise a sticky, viscous and/or tacky (liquid) form of the binder, through which the bonder may advantageously facilitate bonding between individual fibers.

In certain embodiments, the binder system of the present application may be onto mineral wool fibers in an unreacted or substantially unreacted chemical state. In certain applications, the ability to spray the binder solution onto the mineral wool fibers in a substantially unreacted state may alleviate problems associated with pre-reacting the binder components in solution, which have been encountered with previously disclosed binder systems in which the components are pre-reacted. Some previously disclosed binders include binders consisting essentially of pre-reacted polymers or resins, which are applied to the materials to be bound. With substantially unreacted binder present on the mineral wool fibers in the form of a sticky, viscous or tacky liquid, the reaction between the binder components may occur in a substantially dry state, which may be described as a bulk polymerization because it is occurring without the benefit of a solvent. Accordingly, a particular advantage of the present technology is a binder system that can polymerize in a substantially dry state, as well as through bulk polymerization.

As described herein, the term "carbohydrate" includes one or more polyhydroxy aldehydes and/or polyhydroxy ketones, saccharides such as monosaccharides, disaccharides, oligosaccharides and polysaccharides, and additional reducing sugars. The carbohydrate component of the disclosed composition may comprise one or more compounds of the general formula $C_m(H_2O)_n$, wherein m and n may be the same or different from each other, but also includes derivatives comprising amino groups (e.g. glycosamines) or deoxygenated compounds (e.g. deoxycarbohydrates). In certain embodiments, the carbohydrate may comprise one or more reducing aldehyde chemical groups. Moreover, a carbohydrate source for use in the disclosed technology may comprise naturally occurring carbohydrate derivatives, as well as chemically altered derivatives of the same that may be produced during the isolation and/or preparation of the carbohydrate component (e.g. during cellulolysis).

Carbohydrates for use as components or additives in various embodiments of the disclosed composition include both reducing and non-reducing sugars, including monosaccharides and disaccharides, and pentoses and hexoses. Pentoses may include the monosaccharides xylose, arabinose, ribose, lyxose, ribulose and xylulose, including their D- and L-stereoisomers, as well as combinations thereof. Moreover, the pentoses of the present disclosure also include derivatives of monosaccharides, disaccharides, pentoses and hexoses, which may be formed through the addition of an amino group (pentosamines), removal of an oxygen atom (deoxypentoses), rearrangement reactions, protonation and/or deprotonation.

Hexoses for use in the present disclosure may include the monosaccharides allose, altrose, glucose, mannose, gulose, idose, galactose, talose, fructose, psicose, sorbose, tagatose, including their D- and L-stereoisomers, as well as any combination thereof. Moreover, derivatized hexoses may be formed, for instance, through the addition of one or more amino groups (hexosamines), through the removal of one or more oxygen atoms (deoxyhexoses), through rearrangement reactions, and through protonation or deprotonation. In some embodiments, the hexose comprises dextrose or a carbohydrate mixture comprising dextrose.

According to a further embodiment, the present technology relates to a binder composition as defined above, wherein the carbohydrate component (b) further comprises one or more carbohydrates, including one or more pentoses and/or hexose(s), in a total amount of 30-97% by mass, based on the mass of the total carbohydrate component (b). In certain embodiments, the concentration of carbohydrate(s) may by adjusted to achieve improved curing rates of the binder composition, and may, for example be in the range of 35-97%, 40-97% and 45-97% by mass, based on the total mass of the carbohydrate component (b).

In additional embodiments, an aqueous solution of carbohydrate component (b) comprising 35-97%, 40-97%, and 45-97% by mass, based on the mass of the total carbohydrate component (b), may be obtained after the hydrolysis and isolation of the disclosed binder composition. Similarly, carbohydrate component (b) may be present in an aqueous solution obtained following hydrolysis and isolation of the binder composition of the present disclosure at a concentration of 30-95%, 30-90%, and 30-85% by mass, based on the mass of the total carbohydrate component (b) present in an aqueous solution of the binder composition.

In some embodiments, carbohydrate source(s) for use in the disclosed technology may include environmentally beneficial sources including sustainable green carbohydrate sources and/or industrial waste streams selected from the group consisting of agricultural residues including but not limited to corn stover and sugarcane bagasse; dedicated energy crops including but not limited to sugar beet, switchgrass, *Miscanthus*/silvergrass, hemp, willow and corn; wood residues including but not limited to wood chips, timber bark, saw mill discards and paper mill discards; municipal paper waste including but not limited to recyclable paper and low grade paper waste; and industrial cellulose based waste streams including but not limited to brewery waste and dairy waste streams. In further embodiments, the carbohydrate component (b) includes combining carbohydrates and/or carbohydrate mixtures optionally obtained from at least two different carbohydrate sources.

In additional embodiments, the sources of the carbohydrates constituting the carbohydrate component (a) of the binder composition as defined above may be derived from renewable and/or recyclable sources, including but not limited to cellulose-based sources present in green and photosynthetic plants, plant products, wood and bark, recyclable packaging, brewery waste and other industrial waste streams. Carbohydrate sources for use in the present technology may further include recyclable paper, paper mill waste, and related waste or discard from industrial paper production processes including pulp discards, non-recyclable low-grade paper waste, contaminated cellulose-containing waste, cellulose-containing composite materials, etc.

The term "amine" as used herein generally includes any compound(s) acting as a nitrogen source capable of undergoing a polymerization reaction with a carbohydrate. Amines selected from the group consisting of proteins, peptides, amino acids, organic amines, polyamines, ammonia, ammonium salts of a monomeric polycarboxylic acid, ammonium salts of a polymeric polycarboxylic acid, and ammonium salts of an inorganic acid, or any combination thereof may be incorporated into the disclosed composition.

In certain embodiments, an amine for use in the present disclosure may comprise one or more of triammonium citrate, ammonium sulfate, ammonium phosphate including mono- and diammonium phosphate, diethylenetriamine, aliphatic amines including 1,4-butanediamine, 1,5-pentanediamine, hexamethylenediamine, 1,7-heptanediamine, 1,8-octanediamine, 1,9-nonanediamine, 1,10-decanediamine, 1,11-undecanediamine, 1,12-dodecanediamine, 1,5-diamino-2-methylpentane, a Jeffamine® (Huntsman Corporation, The Woodlands, Tex., USA), a polyamine, a polyamine comprising two or more primary amine groups, separated by an alkyl group, particularly an alkyl group comprising at least 4 carbon atoms, a heteroalkyl group, a cycloalkyl group, a heterocycloalkyl group, as well as derivatives and combinations thereof.

The amine- or nitrogen-based components utilized in certain embodiments of the disclosed technology may comprise 1-25% by mass, including 2-20% and 3-15% by mass, based on the total mass of the solid content of the disclosed binder composition. In addition, the amines, amino acids, ammonium salts and related, nitrogen-based components disclosed herein may be derived from recyclable, renewable and/or environmentally friendly sources, including but not limited to cellulose-based sources present in photosynthetic/green plants, non-photosynthetic/autotrophic plants, plant products, wood, used paper, paper mill waste, etc.

The aqueous curable binder composition disclosed herein may be cured by any curing process or technology known to the skilled artisan, including but not limited to heat, irradiation, the use of curing initiators, etc. In some embodiments, the composition comprises a binder obtainable by heating the binder composition as described herein.

The aqueous curable binder composition disclosed herein and/or produced by methodologies in accordance with the instant disclosure may be applied to, for example, a collection of loose matter and cured or cross-linked, for example by heating, wherein the binder may hold a collection of loose matter together. Additionally, the binder may be used to impregnate a surface and/or to provide a coating at a surface of loose matter for producing an insulation product.

The composition of the present disclosure may be incorporated, in various embodiments, in insulation and additional commercial products selected from the group consisting of mineral wool insulation, glass wool insulation, stone wool insulation, a collection of fibers, a collection of particles, a collection of cellulose containing particles or fibers, a wood board, an orientated strand board, a wood particle board, plywood, an abrasive, a non-woven fiber product, a woven fiber product, a foundry mold, a refractory product, a briquette, a friction material, a filter, an impregnated laminate and "shipout (or "ship out") uncured" insulation products and accessories such as those described, e.g. in WIPO Pat. App. Pub. No. 2008/091256 and U.S. Pat. App. Pub. No. 2016/0347652.

In certain embodiments, the disclosed binder composition may be used for mineral wool insulation applications in a (cured or uncured) concentration of greater than or equal to 2%, 3% or 4% by weight, or less than or equal to 17%, 15%, 12%, 10% or 8% by weight, with respect to the total (dry) weight of the binder and the mineral wool. The binder concentration may be measured by methods known to the skilled artisan, including but not limited to weight loss or change as measured by the ignition of the composition.

In some embodiments, when used as a binder for wood boards or cellulosic materials, the amount of a cured binder (weight of dry binder to weight of dry wood or to weight of dry cellulosic containing material) may be greater than or equal to 7%, 10% or 12%, and/or less than or equal to 25%, 20%, 18% or 15%.

The presently disclosed binder system is beneficially devoid of environmentally problematic reactants and products such as formaldehyde, while advantageously characterized by improved cure rates for reducing cure times and/or temperatures in accordance with certain embodiments. In addition, the composition may be produced using renewable carbohydrate sources such as those described herein.

As used herein, the term "dry weight" refers to the dry weight based on total weight of dry binder solids. In addition, the terms "consisting of" and "consisting essentially of" are intended to limit the scope of a claim to the specified materials or steps and those that do not materially affect the basic and inventive characteristic(s) of the claimed limitations.

EXAMPLE

Example 1

The binder formulations shown in Table 1, comprising one of 1) high-fructose corn syrup and ammonium sulfate (HFCS-AS), 2) high-fructose corn syrup and diammonium phosphate (HFCS-DAP), or 3) high-fructose corn syrup and saccharin salt (HFCS-Sac) at varying carbohydrate (HFCS) to saccharin ratios, were used to prepare 3% binder solid solutions.

As shown in Table 1, various chemical formulations for HFCS-AS (which may be utilized in light density insulation products), HFCS-DAP (which is often used in board based and/or corrosion sensitive insulation products), and HFCS-Sac (comprising HFCS and ammonium saccharin, a cyclic sulfonamide) at ratios of 2:1, 3:1, 4:1 and 5:1 (HFCS:Sac) were prepared. 8"×10" glass filter paper sheets were impregnated with 40-50 ml of the binder solutions, dried at 200±5° F. for 10 minutes, and cured at various temperatures (400° F., 450° F. and 500° F., see FIGS. 1 and 2) for 5 minutes. The dry tensile strength, weathered tensile strength after weathering at 177° F. for 10 minutes, extract pH, and extract absorbance at 470 nm were recorded for each of the samples in Table 1.

Various experimental data and measurements for the binder systems of Table 1 are provided in FIGS. 1 and 2. Several of the cured HFCS:Sac binder compositions, notably the 4:1 and 5:1 compositions, are characterized by comparable curing rates as well as dry/wet tensile strengths in comparison with the HFCS-AS and HFCS-DAP binder systems disclosed herein. Additionally, while the pH values produced in accordance with the present application may range from 4.0-8.0, including 6.0-8.0, in certain embodiments the extract pH values for the cured HFCS-Sac binder systems described in Table 1 may beneficially comprise approximately neutral (about 7.0, including a pH range of about 6.5 to about 7.5) values following sufficient curing, which advantageously enhances the value of HFCS-Sac binder systems in corrosion-sensitive or corrosion-prone applications and insulation products.

TABLE 1

| Formula Name | Materials | Dry Formula (% by weight) |
|---|---|---|
| HFCS-AS | Water | 0 |
| | HFCS | 80.34 |
| | AS | 16.82 |
| | $NH_3$ | 2.52 |
| | Silane A1101 | 0.32 |
| HFCS-DAP | Water | 0 |
| | HFCS | 92.9 |
| | DAP | 6.77 |
| | A1101 | 0.33 |
| HFCS-Sac (2:1) | Water | 0 |
| | HFCS | 65.35 |
| | Ammonium Saccharin | 32.67 |
| | $NH_3$ | 1.98 |
| HFCS-Sac (3:1) | Water | 0 |
| | HFCS | 73.53 |
| | Ammonium Saccharin | 24.51 |
| | $NH_3$ | 1.96 |
| HFCS-Sac (4:1) | Water | 0 |
| | HFCS | 78.43 |
| | Ammonium Saccharin | 19.61 |
| | NH3 | 1.96 |
| HFCS-Sac (5:1) | Water | 0 |
| | HFCS | 81.48 |
| | Ammonium Saccharin | 16.49 |
| | $NH_3$ | 2.02 |

What is claimed is:

1. An aqueous curable binder composition comprising (a) a benzoic sulfimide, (b) a carbohydrate, alcohol, polyol or combination thereof, and (c) optionally the reaction product of (a) and/or (b), wherein the ratio of carbohydrate, alcohol and/or polyol compound(s) to benzoic sulfimide compound ranges from 0.25:1 to 10:1.

2. The aqueous curable binder composition of claim 1, wherein the binder comprises 1-10% by dry weight benzoic sulfimide.

3. The aqueous curable binder composition of claim 2, wherein the binder comprises 2-5% by dry weight benzoic sulfimide.

4. The aqueous curable binder composition of claim 1, wherein the benzoic sulfimide comprises a saccharin salt.

5. The aqueous curable binder composition of claim 4, wherein the saccharin salt comprises one or more saccharin salts selected from the group consisting of ammonium saccharin, sodium saccharin, potassium saccharin, calcium saccharin and amine salts of saccharin.

6. The aqueous curable binder composition of claim 1, wherein the carbohydrate is selected from the group consisting of high fructose corn syrup (HFCS), reducing sugars, non-reducing sugars, starches and combinations thereof.

7. The aqueous curable binder composition of claim 1, wherein the alcohol comprises polyvinyl alcohol (PVA).

8. The aqueous curable binder composition of claim 1, wherein the binder is anhydrous.

9. The aqueous curable binder composition of claim 1, wherein the ratio of carbohydrate or alcohol compound to benzoic sulfimide compound ranges from 4:1 to 5:1.

10. The aqueous curable binder composition of claim 1, further comprising one or more matrix polymers selected from the group consisting of amines, organic acids, inorganic acids, organic amine salts, inorganic amine salts, naturally derived polymers, polysaccharides, cellulose, starch, alginate, hyaluronic acid, carboxymethyl cellulose (CMC), sodium carboxymethyl cellulose (NaCMC), hydroxypropyl cellulose (HPC), 2-hydroxyethyl cellulose (HEC), oligosaccharides, PVA, PVAc, PAN, polyacrylics, polyacrylate, polymethacrylate, polyacrylamide, polymethacrylamides, polyurethanes, polyesters, aliphatic isocyanate oligomers, azetidinium containing polymer, chitosan, derivatives thereof and mixtures thereof.

11. The aqueous curable binder composition of claim 1, further comprising an ammonium source at a ratio of benzoic sulfimide compound to ammonium compound of 1:1 to 20:1.

12. The aqueous curable binder composition of claim 1, further comprising one or more dyes, antifungal agents, antibacterial agents, hydrophobic compounds, silicone containing coupling agents, silane, dedusting oil and hydrophobic polymers.

13. The aqueous curable binder composition of claim 1, wherein the composition is curable at a temperature of 50-200° C.

14. The aqueous curable binder composition of claim 1, wherein the composition is uncured.

15. An assembly of fibers or particles bonded with the aqueous binder composition of claim 1.

16. The assembly of fibers of claim 15, comprising an insulation product selected from the group consisting of mineral wool mat, fiberglass insulation mat, rockwool mat and natural fiber mat.

17. The assembly of fibers of claim 16, wherein the insulation product is uncured.

* * * * *

(12) SUPPLEMENTAL EXAMINATION CERTIFICATE

United States Patent
Hardy et al.

(10) Number: US 10,927,246 F1
(45) Certificate Issued: Feb. 23, 2024

Control No.: 96/050,023

Filing Date: Dec. 29, 2023

Primary Examiner: Jerry D Johnson

No substantial new question of patentability is raised in the request for supplemental examination. See the Reasons for Substantial New Question of Patentability Determination in the file of this proceeding.

(56) Items of Information

OTHER DOCUMENTS

Declaration for Christopher George Hardy dated September 9, 2019.

Declaration for John P. Wade dated September 9, 2019.

Supplemental Declaration of Christopher George Hardy dated October 25, 2023.

Supplemental Declaration of John P. Wade dated October 24, 2023.